J. C. Craft,
Carpet Cleaner.

No. 112,421.  Patented Mar. 7, 1871.

J. C. Craft,
Carpet Cleaner.
No. 112,421. Patented Mar. 7, 1871.

Witnesses: Inventor:
J Crew Craft
per
Attorneys.

UNITED STATES PATENT OFFICE.

JOHN CREW CRAFT, OF BALTIMORE, MARYLAND, ASSIGNOR TO HIMSELF AND ANTONIO ROSELLO, OF SAME PLACE.

IMPROVEMENT IN CARPET-CLEANING MACHINES.

Specification forming part of Letters Patent No. 112,421, dated March 7, 1871.

*To all whom it may concern:*

Be it known that I, JOHN CREW CRAFT, of Baltimore, in the county of Baltimore and State of Maryland, have invented a new and Improved Carpet-Cleaning Machine; and I do hereby declare the following to be a full, clear, and exact description of the same, reference being had to the accompanying drawing, making a part of this specification, in which—

Figure 1:
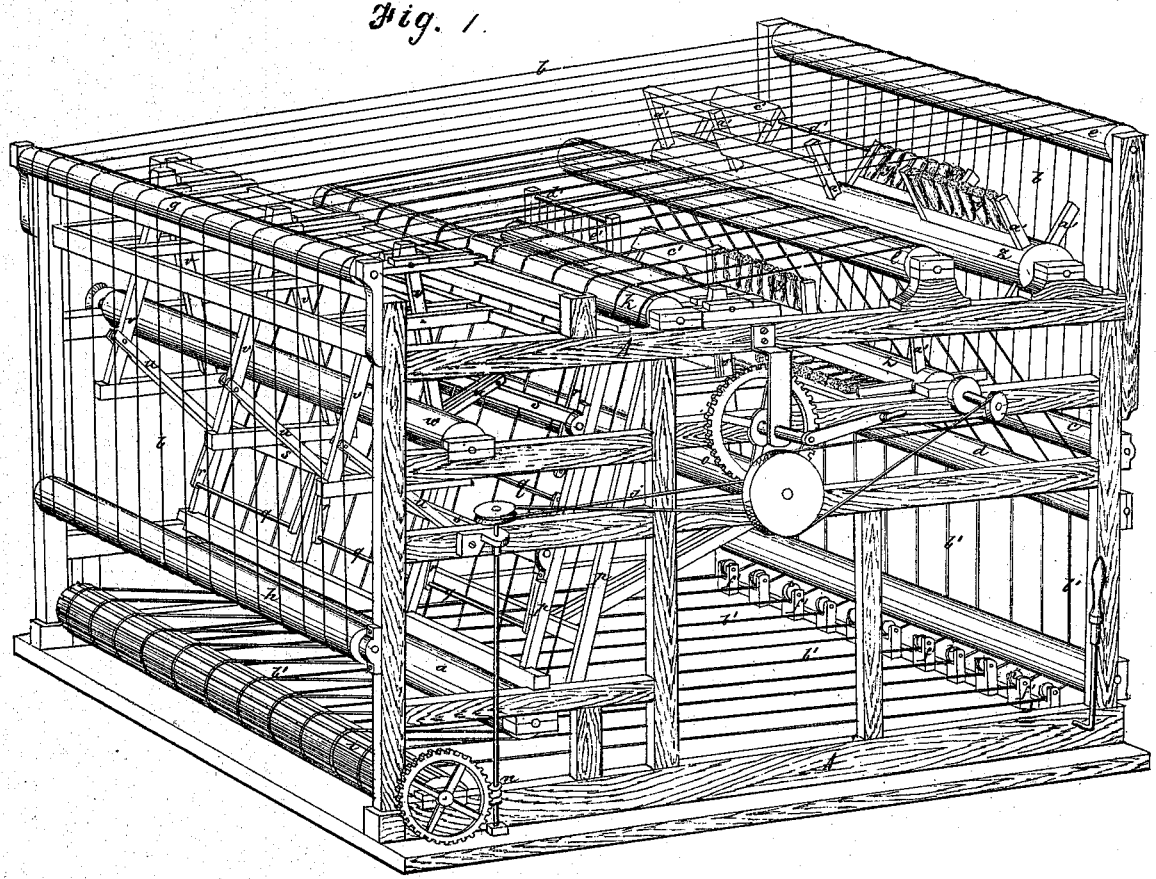
Figure 2:
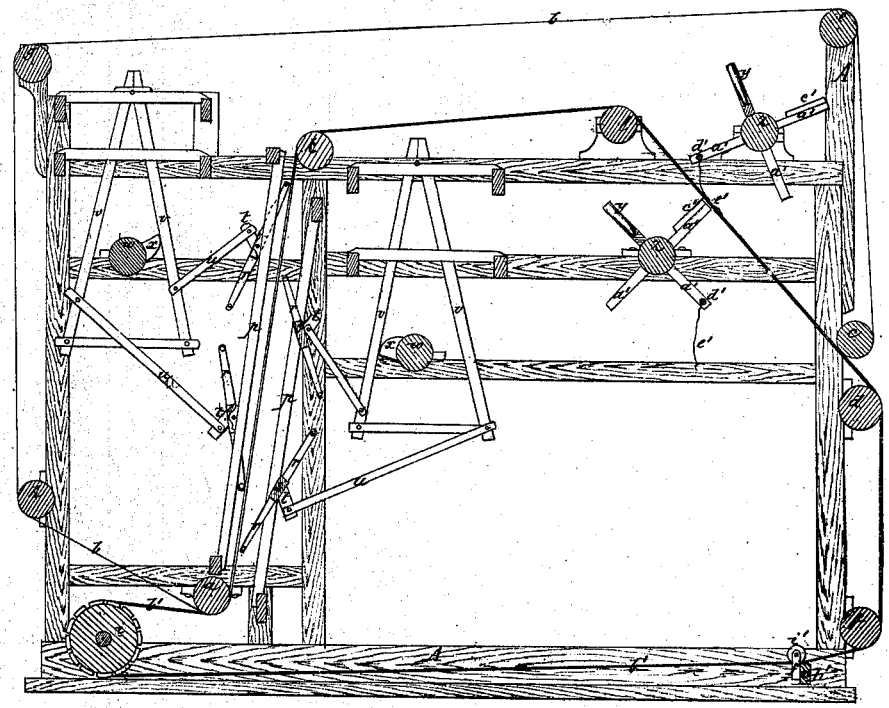
Figure 3:
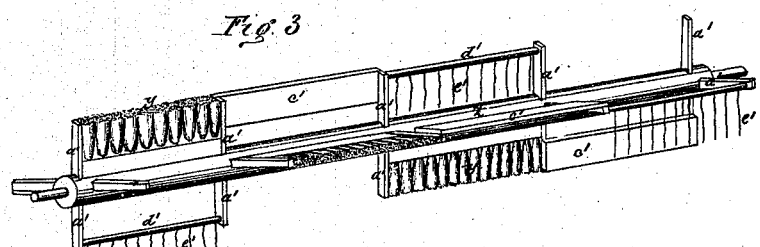

Figure 1 is a perspective view; Fig. 2, a sectional elevation, and Fig. 3 a perspective view of the brushes.

This invention relates to a machine through which a carpet may be passed, and so beaten and brushed during its passage as to come out of the machine thoroughly cleansed.

The invention consists in a novel arrangement of belts and cords for carrying the carpet, vibratory beaters for beating it, and rotatory brushes for brushing it.

Referring to the drawing, A is a wooden or iron frame-work having a place at one end for the introduction of a piece of carpeting, a place at the rear end for the egress of the carpet, and an intermediate passage-way for the conduct of the carpet through the machine.

The place of introduction is just beneath the transverse roller $a$, at the point where a series of parallel endless cords, $b$, becomes intermediate with a series of parallel endless belts, $b'$, both series passing under the roller $a$, where begins the passage-way between said cords and belts, through which the carpet is conducted to the place of egress at the rear end of the frame-work A, between the rollers $c$ $d$, beneath the former of which the cords pass, and over the latter of which the belts pass, the cords thence running vertically upward to the roller $e$ and the belts vertically downward to the roller $f$. From the roller $e$ the cords are led backward to the roller $g$ at the upper front corner of the frame-work A, thence straight downward to the roller $h$, and thence inclined downward and forward to the roller $a$, where they coincide with the belts $b'$, as above mentioned. From the roller $f$ the belts $b'$ pass straight backward to the roller $i$ at the lower front corner of the frame-work A, taking a half-turn round which they pass thence forward to the roller $a$, where they coincide with the cords $b$. From the roller $a$ the cords and belts are led together up to and over the rollers $k$ $l$, and thence downward to the place of egress of the carpet, where they diverge, as before described. Between the points of the coincidence between the cords and belts— namely, the rollers $a$ and $c$—the carpet runs beneath the cords and above the belts, being, as it were, interwoven like the filling of a piece of cloth.

The cords receive motion from the roller $a$ and the belts from the roller $i$. The roller $a$ receives motion from a band connecting it with the roller $i$, and the latter is turned by a toothed wheel, $m$, placed on its shaft outside of the frame A, with which wheel a vertical worm, $n$, connects.

The worm is rotated by a belt, $j$, which connects a sheave on the worm-shaft with a sheave on the main driving-cylinder $o$. The movement of the cords and belts carries the carpet forward.

While the carpet is passing from the roller $a$ to the roller $k$ it is beaten, and while passing between the rollers $l$ and $c$ it is brushed.

The beating is accomplished by a series of beaters placed in frames $p$, that extend on both sides of the carpet from one side of the frame A to the other.

Each beater consists of rods $q$, which connect the extremities of cross-bars $r$, that extend to each side of a central bar, $s$, the rods $q$ being parallel with the bar $s$, and one at each side thereof. The bar $s$ of each beater is mounted in boxes lengthwise of the frame $p$.

The beaters discharge their office by striking with the rods $q$, alternately, the face of the carpet, and this striking is effected by imparting to the central bar $s$ a vibratory movement by means of an inclined arm, $t$, extending from the bar $s$, the outer ends of which arms are connected by rods $u$ with the side pieces of triangular frames $v$, that are hung at their apexes in the frame-work A, and inclose a horizontal shaft, $a$, placed crosswise of said frame-work, which shaft bears, opposite each frame $v$, a cam, $x$, that, as the shaft $w$ revolves through the application of any suitable mechanism, strikes alternately the side pieces of the frame $v$ and causes the same to swing first to one side and then to the other.

Each frame $v$ is connected, in this instance, with two of the beaters, and each side swing of the frame causes two of the four bars, $q$, with which it is connected to strike the carpet. The concussion of all the beaters on both sides of the carpet is sufficient to thoroughly loosen and raise the dirt therefrom during the time the carpet is passing from the roller $a$ to the roller $k$.

The brushing of the carpet is essential to the removal therefrom of the dirt loosened by the beaters. The brushes $y$ are attached to shafts $z$, mounted crosswise of the frame A, on both sides of the carpet. The brushes $y$ are constructed of bristles or hair in the ordinary manner.

I have attached four brushes to each shaft $z$, each brush occupying a different section of the shaft, and all extending in different directions therefrom.

The brushes are placed between arms $a'$, that project in groups of four radially from the shaft, at a quadrant's interval from each other, dividing the shaft into four equal sections, in each of which there is, besides the brush $y$, a blade, $c'$, and a bar, $d'$, each attached to a pair of the arms $b'$, lengthwise of and parallel with the shaft, like the brushes, and also, like them, differently placed in each section.

The bars $d'$ carry cords $e'$, which operate on the carpet as whips to bring dust to the surface, where it may be removed by the brushes.

The blades $c'$, acting as fans, blow dust off from the carpet, and prevent it from passing out at the place of egress. By means of the blades, whips, and brushes the carpet is thoroughly cleansed by the time it reaches the place of egress.

The shaft $z$ receives rotation in any suitable manner from the driving-shaft.

The belts $b'$ may be tightened or loosened by means of forked arms $f'$, projecting all in the same direction from a bar, $h'$, and carrying small rollers $i'$ between their forks, beneath which rollers and between the forks run the belts $b'$, either tightly or loosely, according as the bar is turned down or up on its journals by means of the handle $k'$.

Having thus described my invention, what I claim as new, and desire to secure by Letters Patent, is—

The arrangement of the carrying-belts $b'$, cords $b$, vibratory beaters, and rotatory brushes, as specified.

JOHN CREW CRAFT.

Witnesses:
 A. C. ASKEW,
 OTTO RICHTER.